United States Patent
Le et al.

(10) Patent No.: US 11,972,047 B1
(45) Date of Patent: Apr. 30, 2024

(54) CONTROL METHOD AND DEVICE FOR NEAR EYE DISPLAY SYSTEM

(71) Applicant: Tencent America LLC, Palo Alto, CA (US)

(72) Inventors: John D. Le, Woodbury, MN (US); Kun Gao, Palo Alto, CA (US); Yi Zhang, Palo Alto, CA (US); Youngshik Yoon, Palo Alto, CA (US); Hao Zheng, Palo Alto, CA (US); Hongdong Li, Palo Alto, CA (US); Jianru Shi, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 18/186,556

(22) Filed: Mar. 20, 2023

(51) Int. Cl.
*G06F 3/01* (2006.01)
*G09G 3/00* (2006.01)

(52) U.S. Cl.
CPC ............. *G06F 3/013* (2013.01); *G09G 3/001* (2013.01); *G09G 2320/0686* (2013.01); *G09G 2354/00* (2013.01)

(58) Field of Classification Search
CPC ..................... G06F 3/013; G09G 3/001; G09G 2320/0686; G09G 2354/00
See application file for complete search history.

(56) References Cited

U.S. PATENT DOCUMENTS

| | | | | |
|---|---|---|---|---|
| 9,965,030 B2 * | 5/2018 | Jeong | ................ | G02B 27/0093 |
| 10,216,267 B2 * | 2/2019 | Thorn | ................ | H04N 23/62 |
| 10,303,250 B2 * | 5/2019 | Jeong | ................ | G06V 40/193 |
| 10,712,817 B1 * | 7/2020 | Rönngren | ............ | G02B 27/017 |
| 10,719,127 B1 * | 7/2020 | Keith | ................ | G09G 3/3208 |
| 10,983,593 B2 * | 4/2021 | Jeong | ................ | G02B 27/0179 |
| 2016/0034032 A1 * | 2/2016 | Jeong | ................ | G06T 19/006 345/156 |
| 2016/0291690 A1 * | 10/2016 | Thorn | ................ | G06V 40/19 |
| 2018/0136719 A1 * | 5/2018 | Chen | ................ | G06F 3/013 |
| 2018/0188803 A1 * | 7/2018 | Sharma | ................ | G06F 1/3231 |
| 2018/0224934 A1 * | 8/2018 | Jeong | ................ | G02B 27/0179 |
| 2018/0286070 A1 * | 10/2018 | Benedetto | ................ | G06T 7/62 |
| 2019/0235625 A1 * | 8/2019 | Jeong | ................ | G02B 27/0172 |
| 2019/0286227 A1 * | 9/2019 | Samadani | ............ | G06V 40/193 |
| 2020/0341547 A1 * | 10/2020 | Samadani | ............ | G02B 27/017 |

(Continued)

OTHER PUBLICATIONS

Artal, P. and Navarro, R., 1994. Monochromatic modulation transfer function of the human eye for different pupil diameters: an analytical expression. JOSA A, 11(1), pp. 246-249.

(Continued)

*Primary Examiner* — Michael Pervan
(74) *Attorney, Agent, or Firm* — ANOVA LAW GROUP PLLC

(57) ABSTRACT

A method for controlling a near eye display system, includes obtaining an eye movement of a user wearing the near eye display system using an eye tracking sensor of the near eye display system, determining a target area of a display of the near eye display system based on the eye movement of the user, the target area of the display being an area that the user is looking at, and controlling a brightness of the target area of the display of the near eye display system to cause a size of a pupil of the user to be in a predetermined range.

20 Claims, 10 Drawing Sheets

---

Obtain an eye movement of a user wearing a near eye display system using an eye tracking sensor of the near eye display system S802

↓

Determine a target area of a display of the near eye display system based on the eye movement of the user S804

↓

Control a brightness of the area of the display of the near eye display system to cause a size of a pupil of the user to be in a predetermined range S806

(56) References Cited

U.S. PATENT DOCUMENTS

2022/0197377 A1* 6/2022 Kim .................... G09G 3/2092
2023/0196522 A1* 6/2023 Weinstock ............. G06T 5/006
                                                    382/275

OTHER PUBLICATIONS

Napieralski, P. and Rynkiewicz, F., 2019. Modeling human pupil dilation to decouple the pupillary light reflex. Open Physics, 17(1), pp. 458-467.
Goldman, D.B., 2010. Vignette and exposure calibration and compensation. IEEE transactions on pattern analysis and machine intelligence, 32(12), pp. 2276-2288.

* cited by examiner

CONTROL METHOD AND DEVICE FOR NEAR EYE DISPLAY SYSTEM

FIELD OF THE TECHNOLOGY

This application relates to the field of near eye display technologies and, specifically, to control method for near eye display system, near eye display system, and storage medium.

BACKGROUND

Nowadays, near eye display (NED) becomes much more popular. The NED is used to not only watch movies, play games, but also conduct office works, such as reading and writing of papers, books, and presentation. However, low brightness and low contrast of the display screen may cause a pupil size of a user wearing the NED to increase in order to clearly see the display content, so that the user may feel tired of the eye soon, thereby affecting the user experience and efficiency. Moreover, strayed light intensity originated from farer field locations of an eye-gazing field location may be higher than strayed light intensity originated from near filed location of the eye-gazing filed location, so ghosts and the strayed light may be generated, affecting the vision of the user viewing the display content.

The disclosed methods and systems are directed to solve one or more problems set forth above and other problems.

SUMMARY

Embodiments of the present disclosure introduce a brightness control process of a display of a near eye display system. In the process, an eye movement of a user wearing the near eye display system is obtained using an eye tracking sensor of the near eye display system, an area of a display of the near eye display system is determined based on the eye movement of the user, where the area of the display is an area that the user is looking at. Then, a brightness of the area of the display of the near eye display system is controlled to cause a size of a pupil of the user to be in a predetermined range.

One aspect of the present disclosure provides a method for controlling a near eye display system. The method includes: obtaining an eye movement of a user wearing the near eye display system using an eye tracking sensor of the near eye display system, determining a target area of a display of the near eye display system based on the eye movement of the user, the target area of the display being an area that the user is looking at, and controlling a brightness of the target area of the display of the near eye display system to cause a size of a pupil of the user to be in a predetermined range.

Another aspect of the present disclosure provides a device for controlling a near eye display system. The near eye display system includes a display and an eye tracking sensor configured to track an eye movement of a user. The device includes a memory storing a computer program and a processor. The processor is configured to execute the computer program to: obtain the eye movement of the user using the eye tracking sensor of the near eye display system, determine a target area of the display of the near eye display system based on the eye movement of the user, the target area of the display including an area that the user is looking at, and control a brightness of the target area of the display of the near eye display system to cause a size of a pupil of the user to be in a predetermined range.

Another aspect of the present disclosure provides a non-transitory storage medium storing computer instructions. The computer instructions, when executed by a processor, cause the processor to perform: obtaining an eye movement of a user wearing a near eye display system using an eye tracking sensor of the near eye display system, determining a target area of a display of the near eye display system based on the eye movement of the user, the target area of the display including an area that the user is looking at, and controlling a brightness of the target area of the display of the near eye display system to cause a size of a pupil of the user to be in a predetermined range.

Other aspects of the present disclosure can be understood by those skilled in the art in light of the description, the claims, and the drawings of the present disclosure.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

The following describes the technical solutions in the embodiments of the present invention with reference to the accompanying drawings. Wherever possible, the same reference numbers will be used throughout the drawings to refer to the same or like parts. Apparently, the described embodiments are merely some but not all the embodiments of the present invention. Other embodiments obtained by a person skilled in the art based on the embodiments of the present invention without creative efforts shall fall within the protection scope of the present disclosure.

The present disclosure provides a method and a device for controlling a near eye display system. The visual image perception of the near eye display system involves three optics: a display, a lens, and an eye. Optical features and performances of the lens and the eye are discussed below, to introduce contents and benefits of the disclosed method and device.

Figure 1:
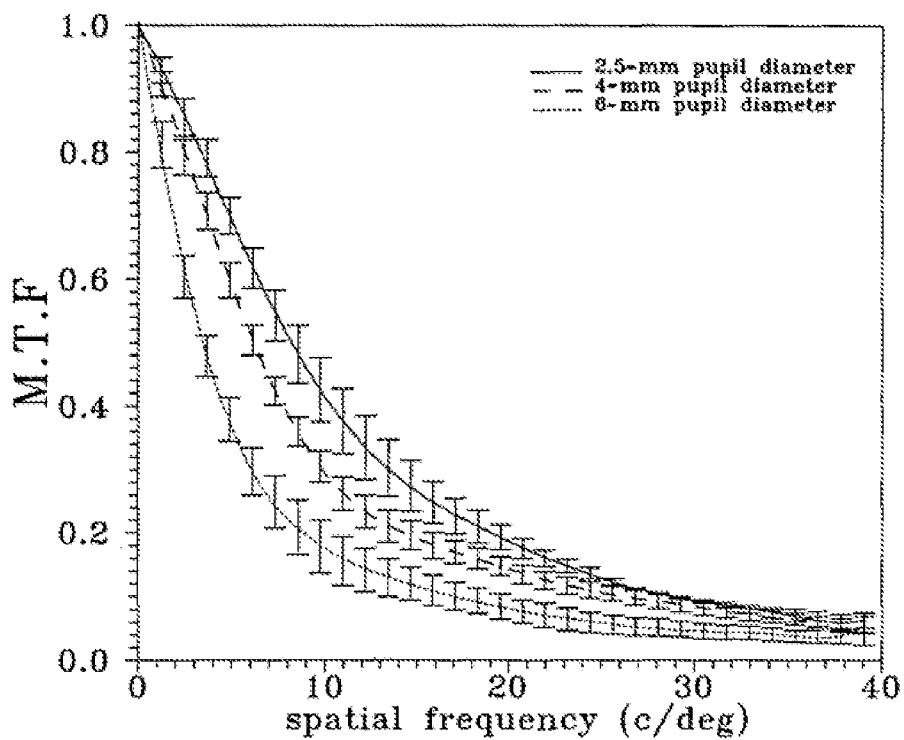
FIG. 1 illustrates an average modulation transfer function (MTF) for a group of normal young subjects for three pupil diameters in Napieralski et al.

A modulation transfer function (MTF) is a parameter used to evaluate the performance of an optical system, such as a human eye, a lens system, etc. The MTF provides a quantitative and standardized way to characterize optical systems. The value of the MTF indicates how much of the object's contrast is captured in the image as a function of spatial frequency. The MTF tends to decrease with increasing spatial frequency from 1 to 0. FIG. 1 illustrates an average modulation transfer function (MTF) for a group of normal young subjects for three pupil diameters in Napieralski et al. As shown in FIG. 1, the MTF of the smaller pupil diameter (e.g., 2.5 mm and 4 mm) is much higher than the MTF of the larger pupil diameter, especially for a lower spatial frequency. For example, at spatial frequency of 10 cycle per degree, the MTF for 6 mm pupil is about 18% versus the MTF for 2.5 mm pupil is about 45%. Therefore, it is better to design the near eye display system with high intensity to allow the user to see better, especially for application requires text reading. That is, the user can view the displayed content better when the pupil diameter of the user is smaller, such as being less than or equal to 4 mm.

Figure 2:
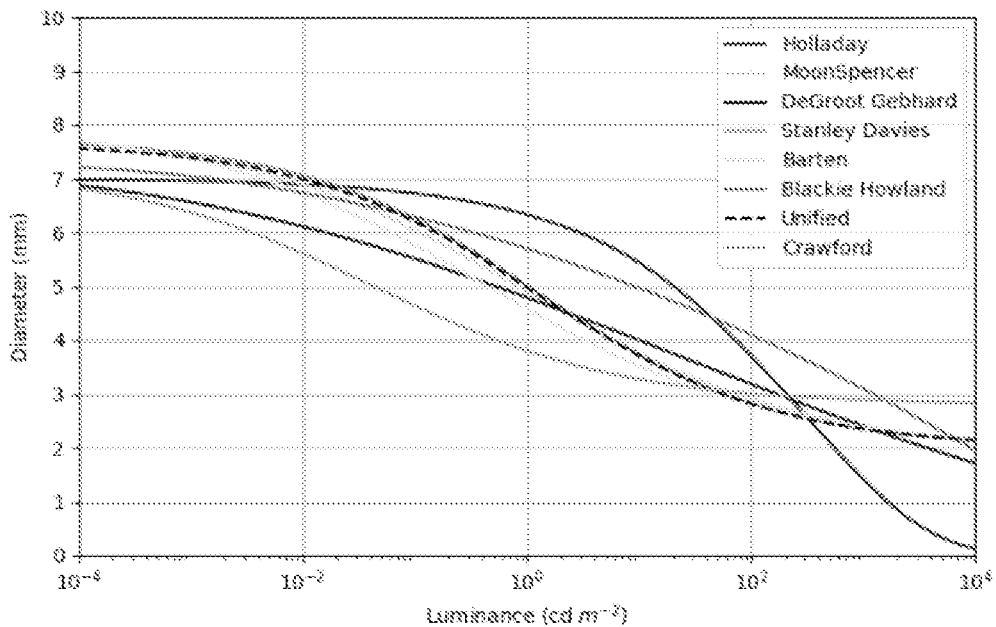
FIG. 2 illustrates vignette and exposure calibration and compensation in Goldman et al.

In order to consider how much local brightening is acceptable without causing the user to perceive image as undesirable tunneled image, human vision perception of vignetting is considered. In term of psychology of perception, vignetting may help to focus eye to area that is highlighted, and the effect can be subtle or not consciously noticed by the viewer. FIG. 2 illustrates vignette and exposure calibration and compensation in Goldman et al. As shown in FIG. 2, vignetting for even high-quality fixed focal length lenses can be 90% to 40% (less light at the corners of an image than at its center) and even more vignetting for zoom and wide-angle lens. For example, intensity at center field where eyes look at may be adjusted to be higher than 20%, 90%, 40%, 50% intensity at farer field, e.g., 90 degree from center field.

Figure 3:
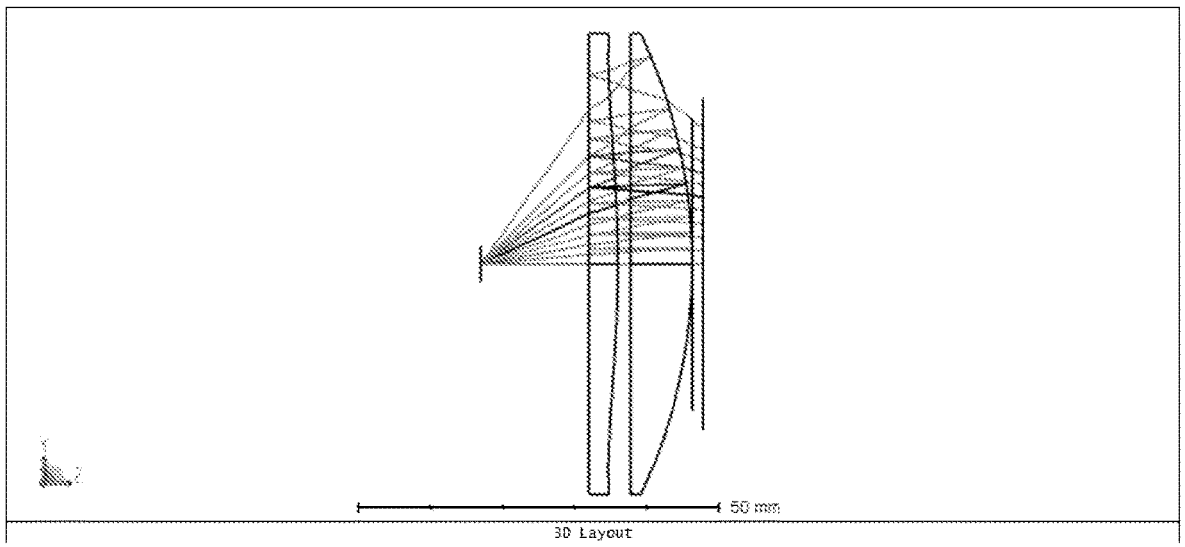
FIG. 3 illustrates an example optic system of a near eye display system.
Figure 4A:
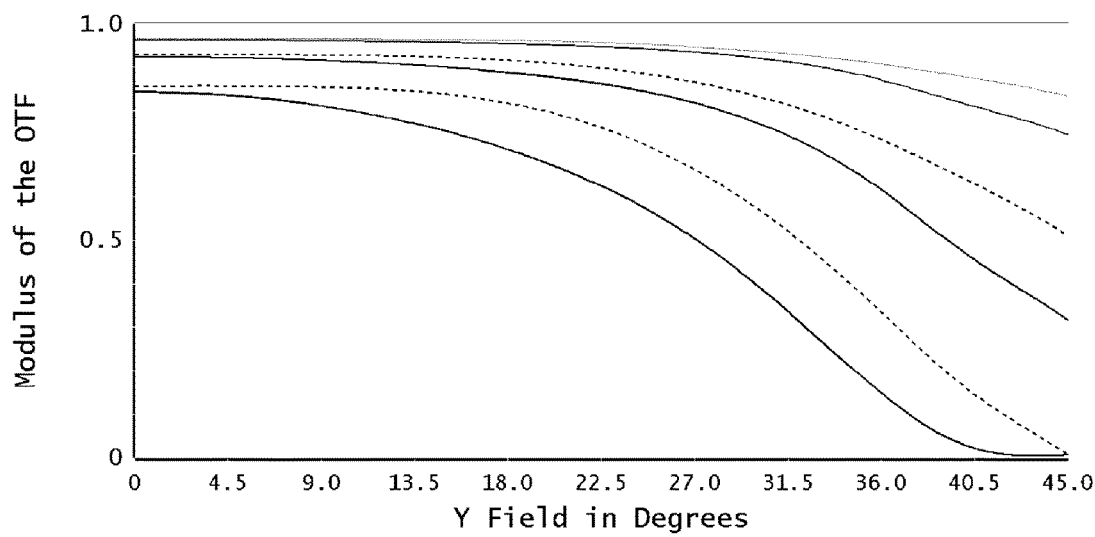
FIG. 4A illustrates the MTF for 2 mm pupil with 2.1 mm decenter and eye looking at 10 degree filed image location.
Figure 4B:
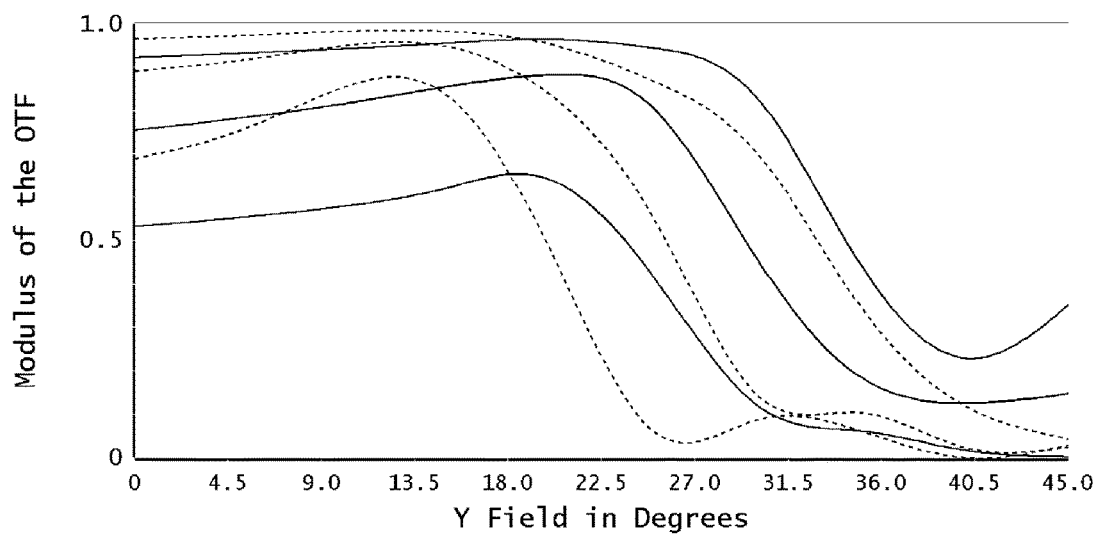
FIG. 4B illustrates the MTF for 8 mm pupil with 2.1 mm decenter and eye looking at 10 degree filed image location.
Figure 5A:
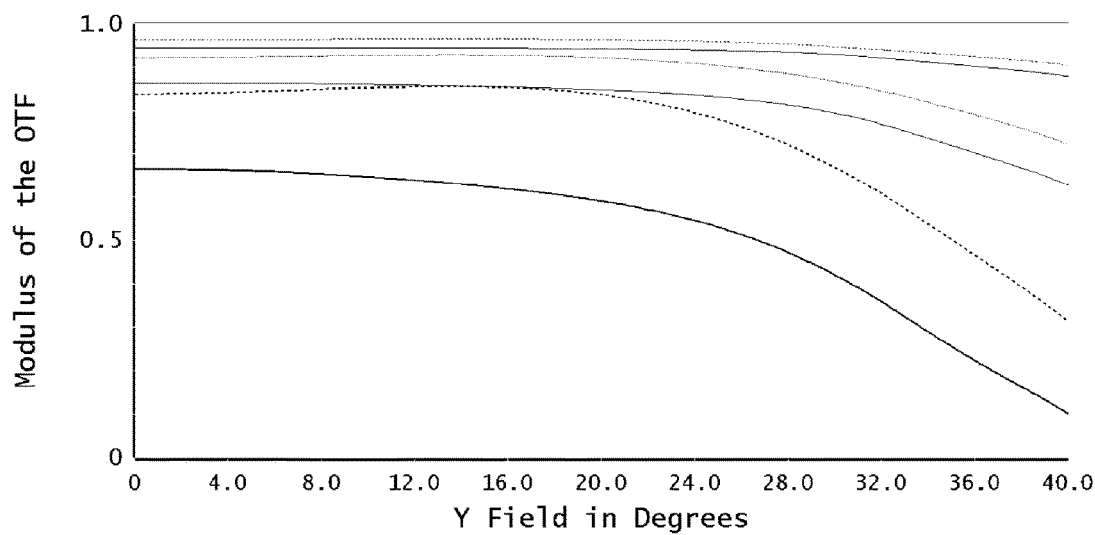
FIG. 5A illustrates the MTF for 2 mm pupil with 4.4 mm decenter and eye looking at 20 degree filed image location.
Figure 5B:
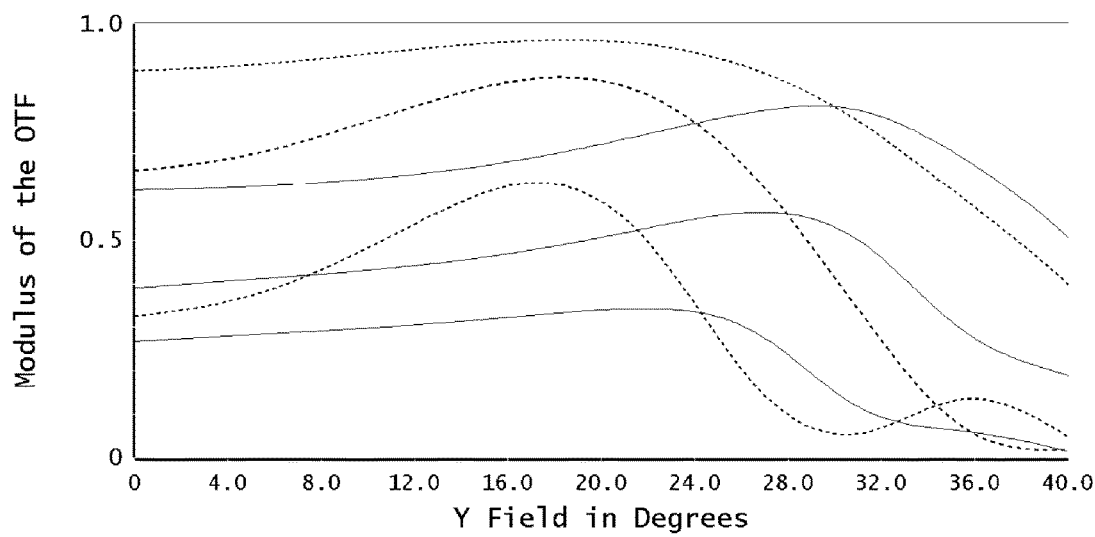
FIG. 5B illustrates the MTF for 8 mm pupil with 4.4 mm decenter and eye looking at 20 degree filed image location.
Figure 6A:
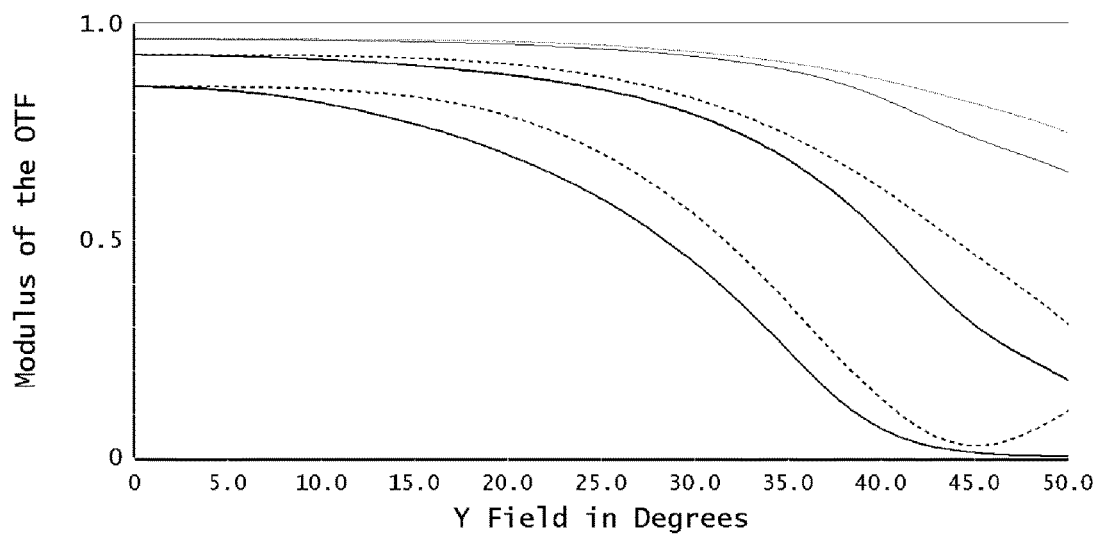
FIG. 6A illustrates the MTF for 2 mm pupil with 0 decenter and eye looking at 0 degree filed image location.
Figure 6B:
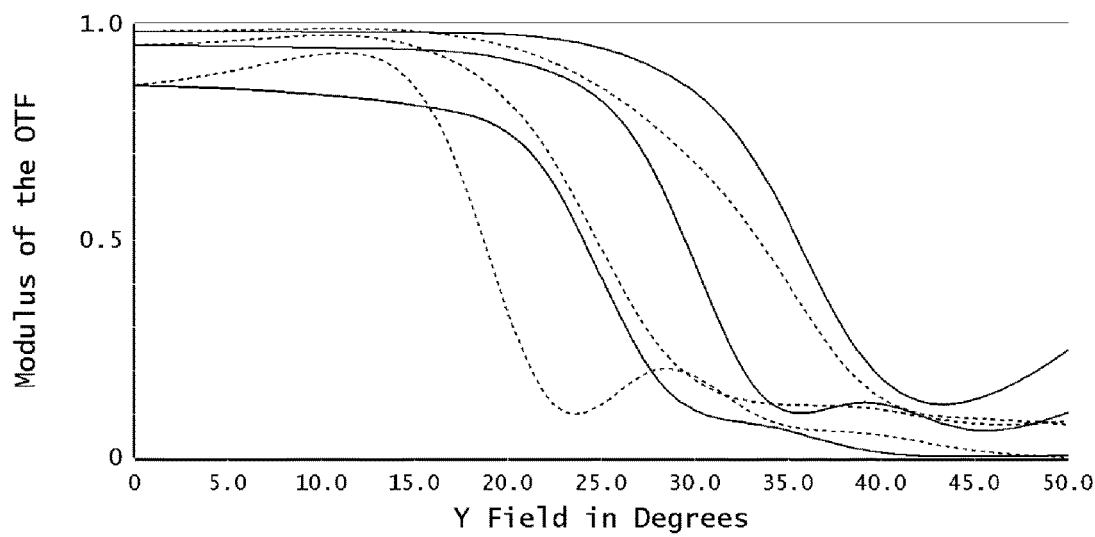
FIG. 6B illustrates the MTF for 8 mm pupil with 0 decenter and eye looking at 0 degree filed image location.

FIG. 3 illustrates an example optic system of a near eye display system. As shown in FIG. 3, a lens on the left side facing the eye, which is constructed with reflective polarizer (RP), is called RP lens, and a lens facing the display, which is constructed with semi-mirror surface or beam splitter (BS), is called BS lens. In some embodiments, the BS lens may be on the left side facing the eye, and the BS lens may be facing the display. The 110-degree field of view (FOV) design has 15 mm of eye relief and a 16 mm lens track length using a 18.9 mm semi-diameter display image circle. FIGS. 4A-6B illustrate the MTF for 2 mm pupil and 8 mm pupil, respectively, with different decenters and different degree filed image location corresponding to the optic system shown in FIG. 3. As shown in FIGS. 4A-6B, in most of the Y field, the MTF at respective frequencies (5, 10, 20 cycle/mm) for sagittal (S), tangential (T), or average are tended to be higher for 2 mm pupil than those for 8 mm pupil.

The visual image perception of the near eye display system involves three optics: a display, a lens, and an eye. As previously discussed, both the eye and the lens have poor MTF with larger pupil size. Since in this system, both the eye and the lens share the same pupil, it is better to target lower pupil size for good imaging, and the eye can adjust pupil with light intensity. By adjusting the intensity for the area where the user is looking at, the user using the near eye display system may not feel tired or feel less tired when, for example, reading a text, writing, or other office work. Further, by adjusting the intensity, the near eye display system can save energy for a long term use.

Figure 7:
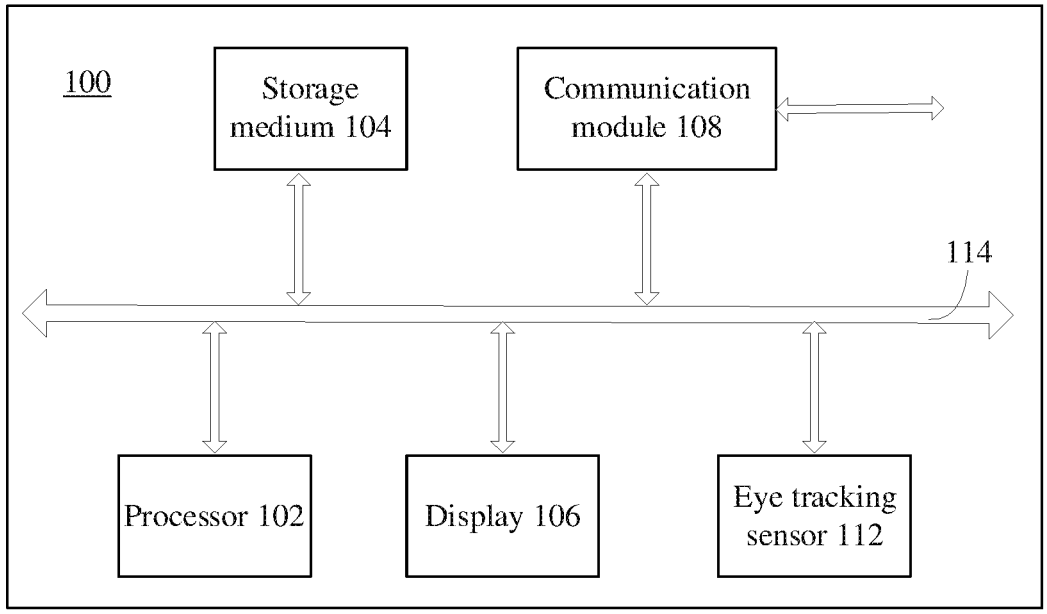
FIG. 7 illustrates a near eye display system consistent with embodiments of the present disclosure.

FIG. 7 is a block diagram of an exemplary near eye display system/device capable of implementing the disclosed control method according to some embodiments of the present disclosure. As shown in FIG. 7, the near eye display system 100 includes a processor 102 and a storage medium 104. The near eye display system 100 also include a display 106 configured to display content to a user wearing the near eye display system, a communication module 108, an eye tracking sensor 112 configured to track an eye movement of the user, and one or more bus 114 to couple the devices together. Certain devices may be omitted and other devices may be included.

The near eye display system 100 may be a head-mounted display (HMD), such as virtual reality (VR) glasses, augmented reality (AR) glasses, and extended reality (XR) glasses. The display content displayed at the display 106 may include text, images, or videos.

The processor 102 may include any appropriate processor(s). In certain embodiments, the processor 102 may include multiple cores for multi-thread or parallel processing, and/or graphics processing unit (GPU). The processor 102 may execute sequences of computer program instructions to perform various processes, such as a display brightness control program, etc. The storage medium 104 may be a non-transitory computer-readable storage medium, and may include memory modules, such as ROM, RAM, flash memory modules, and erasable and rewritable memory, and mass storages, such as CD-ROM, U-disk, and hard disk, etc. The storage medium 104 may store computer programs for implementing various processes, when executed by the processor 102. The storage medium 104 may also include one or more databases for storing certain data such as text script, library data, training data set, and certain operations can be performed on the stored data, such as database searching and data retrieving.

The communication module 108 may include network devices for establishing connections through a network. The display 106 may include any appropriate type of computer display device or electronic device display (e.g., CRT or LCD based devices, touch screens). The near eye display system may include one or more peripheral devices. The peripheral devices may include additional I/O devices, such as a keyboard, a speaker, and so on.

The eye tracking sensor 112 is a device for measuring eye positions and eye movement. In some embodiments, the eye tracking sensor 112 may use some non-contact, optical method for measuring eye motion. The eye tracking sensor may include a video camera or an optical sensor configured to sense infrared light reflected from the eye. Then the sensed information may be analyzed to extract eye rotation from changes in reflections. The eye tracking sensor may use corneal reflection and a center of a pupil of the user as features to track the eye movement. The eye tracking sensor may use reflections from a front of a cornea and a back of a lens as features to track the eye movement. In some embodiments, the eye tracking sensor may image features from inside the eye, such as retinal blood vessels, and follow these features as the eye rotates to track the eye movement. In some embodiments, the eye tracking sensor 112 may include two sensors to track the eye movements for a left eye and a right eye of the user, respectively.

In operation, the processor 102 may be configured to execute instructions stored on the storage medium 104 and perform various operations related to a method for controlling the near eye display system 100 as detailed in the following descriptions. The display brightness control method for the near eye display system can be used in any suitable applications that need to control a brightness of a display of the near eye display system. In one example, the display brightness control method can be applied in office work environment. The office work may include reading and writing of papers, books, or presentations.

Figure 8:
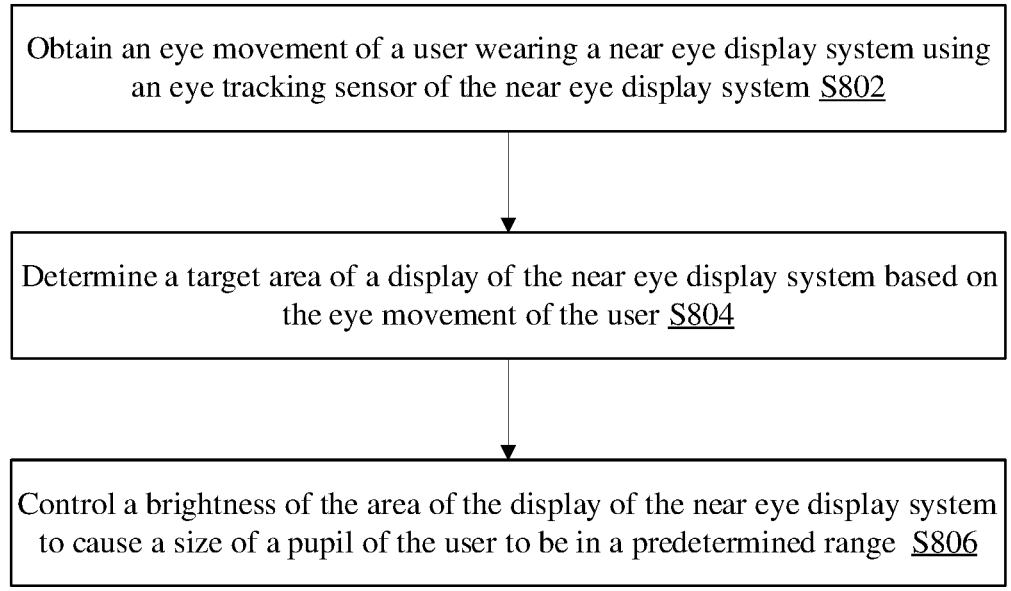
FIG. 8 illustrates a brightness control process of the near eye display system consistent with embodiments of the present disclosure.

As shown in FIG. 8, the method for controlling a near eye display system consistent with embodiments of the present disclosure includes following processes. The method can be implemented, for example, by the computing system 100 shown in FIG. 7.

At S802, an eye movement of a user wearing the near eye display system is obtained using an eye tracking sensor of the near eye display system.

In some embodiments, a gaze direction of an eye of the user may be obtained using the eye tracking sensor. In some embodiments, gaze directions of both left eye and right eye of the user may be obtained using the eye tracking sensor.

In some embodiments, a current size of the pupil of the user is obtained using the eye tracking sensor. The size of the pupil of the user may include a diameter of the pupil of the user. The normal pupil size of a human being may vary from 2 mm to 4 mm in diameter in bright light to 4 mm to 8 mm in the dark. The pupil of the left eye and the pupil of the right eye of the human being may be equal in size.

In some embodiments, the eye movement of the user may be obtained in real time. In some embodiments, the eye movement of the user may be obtained at a predetermined frequency.

At S804, a target area of a display of the near eye display system is determined based on the eye movement of the user. The target area of the display is an area that the user is looking at.

In some embodiments, a distance between the eye of the user and the display of the near eye display system may be obtained.

In some embodiments, the area of the display that the user is looking at is determined based on the gaze direction of the eye of the user and the distance between the eye of the user and the display of the near eye display system.

For example, assuming the area of the display that the user is looking at is a circle. A center of the circle is a point where the gaze direction of the eye intersects the display. A diameter of the circle is determined based on the current pupil size of the user and the distance between the pupil and the display. The area of the display that the user is looking at may be in any suitable shape, such as square, rectangle, ellipse, circle, etc., which is not limited here.

In some embodiments, the area of the display that the user is looking at is determined based on the gaze direction of the eye of the user, the distance between the eye of the user and the display of the near eye display system, and a predetermined Field of Vision (FOV) degree.

For example, assuming the area of the display that the user is looking at is a circle. A center of the circle is a point where the gaze direction of the eye intersects the display. A diameter, Diameter, of the circle is determined based on the distance, Distance, between the pupil and the display and the predetermined FOV degree, θ. For example, Diameter=2*Distance*tan(θ/2). The area of the display that the user is looking at may be in any suitable shape, such as square, rectangle, ellipse, circle, etc., which is not limited here.

At S806, a brightness of the target area of the display of the near eye display system is controlled to cause a size of a pupil of the user to be in a predetermined range.

In some embodiments, the brightness of the target area of the display of the near eye display system may be controlled to be different from a brightness of a non-target area of the display of the near eye display system different form the target area of the display.

In some embodiments, the brightness of the target area of the display of the near eye display system may be controlled to be higher than a brightness of the non-target area of the display of the near eye display system different form the target area of the display.

In some embodiments, step S806 may be performed in response to detecting that the content displayed on the display of the near eye display system satisfies a condition. The condition may indicate that the content has high contrast and requires high-intensity user observation, such as when the user is reading/writing a document, editing a picture, preparing a presentation, etc. Contents that does not satisfy the condition may include, for example, a movie, a comic book, gameplay, etc. Below are some example conditions for determining whether to perform step S806. It can be understood that the conditions listed below can be used independently or combined in different manners to determine whether to perform step S806.

In one example, the processor of the near eye display system may determine a program activated in the near eye display system for displaying on the display. In response to determining that the program activated is an office-type program, the brightness of the target area of the display is controlled to be different from the brightness of the non-target area of the display. An office-type program may be, for example, MICROSOFT OFFICE programs, APPLE IWORK programs, WPS programs, etc. In response to determining that the program activated is a game program or a movie program, the brightness of the target area of the display is controlled to be equal to the brightness of the non-target area of the display, or the brightness of the target area of the display is not adjusted based on the size of the pupil.

In another example, the processor of the near eye display system may detect a percentage of the display of the near eye display system occupied by texts. In response to the percentage of the display occupied by the texts being greater than or equal to a threshold, the brightness of the target area of the display is controlled to be different from the brightness of the non-target area of the display. In response to the percentage of the display occupied by the texts being less than the threshold, the brightness of the target area of the display is controlled to be equal to the brightness of the non-target area of the display or the brightness of the target area of the display is not adjusted based on the size of the pupil. The threshold may be 50%, 60%, 70%, 80%, 90%, etc. The threshold may be predetermined by the user.

In another example, the processor of the near eye display system may detect a number of colors of the content displayed on the display of the near eye display system. In response to the number of colors of the content displayed on the display being less than a number threshold, the brightness of the target area of the display is controlled to be different from the brightness of the non-target area of the display. In response to the number of colors of the content displayed on the display being greater than or equal to the number threshold, the brightness of the target area of the display is controlled to be equal to the brightness of the non-target area of the display or the brightness of the target area of the display is not adjusted based on the size of the pupil. The number threshold may be 2, 3, 4, 5, etc. The number threshold may be predetermined by the user.

In another example, the processor of the near eye display system may determine a background color (e.g., black) and a main foreground color (e.g., white) of the content displayed on the display of the near eye display system, and in response to the background color being a bright color (e.g. an average intensity value of color channels of the background color being higher than a first intensity threshold) and the main foreground color being a dark color (e.g., an average intensity value of color channels of the main foreground color being less than or equal to a second intensity threshold), the brightness of the target area of the display is controlled to be different from the brightness of the non-target area of the display. The main foreground color may be a color that correspond to most foreground pixels of the displayed content. In response to the background color being a dark color or a difference of intensity values between the background color and the main foreground color (e.g., an average difference of intensity values in each color channels) being less than a threshold, the brightness of the target area of the display is controlled to be equal to the brightness of the non-target area of the display or the brightness of the target area of the display is not adjusted based on the size of the pupil.

Figure 9:
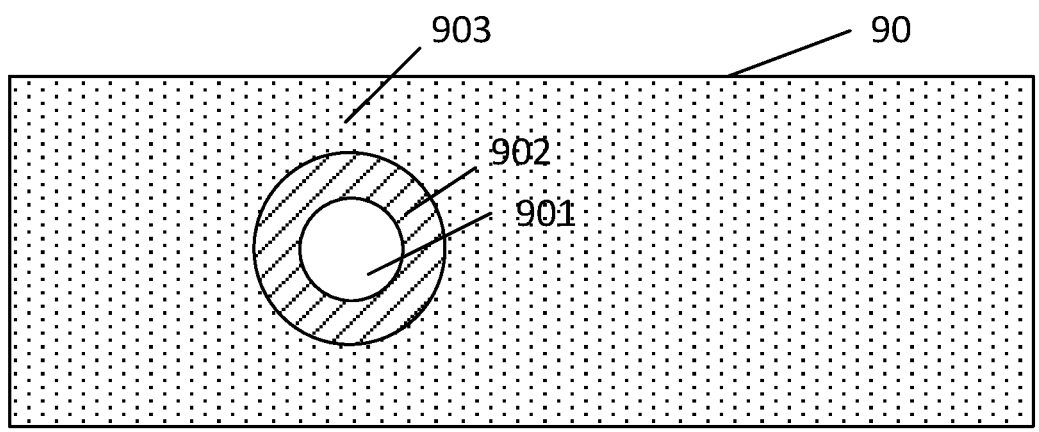
FIG. 9 illustrates areas of a display of the near eye display system consistent with embodiments of the present disclosure.

FIG. 9 illustrates areas of a display of the near eye display system consistent with embodiments of the present disclosure. As shown in FIG. 9, the display 90 includes a first area 901, a second area 902, and a third area 903.

The first area 901 is an area of the display 90 that the user is looking at. The second area 902 and the third area 903 are different from the first area 901. In some embodiments, a brightness of the first area 901 of the display may be controlled to be different from a brightness of the second area 902 and the third area 903. In some embodiments, the brightness of the first area 901 may be controlled to be higher than brightness of the second area 902 and the third area 903.

In some embodiments, the second area 902 may be determined based on a distance between the first area 901 and the second area 902. The distance may be predetermined by the user. The second area 902 includes an area surrounding the first area 901. For example, as shown in FIG. 9, the first area 901 is a circle, and the second area 902 is a circle ring surrounding the first area 902. The second area 902 may be in any suitable shape, such as square, rectangle, ellipse, circle, etc., which is not limited here.

In some embodiments, the brightness of the first area 901 of the display 90 may be controlled to be a first brightness value. The brightness of the second area 902 of the display 90 may be controlled to be a second brightness value. The second brightness value is lower than the first brightness value.

The third area 903 includes the display area of the display 90 except the first area 901 and the second area 902. In some embodiments, the brightness of the third area 903 of the display may be controlled to be a third brightness value. The third brightness value is lower than the second brightness value.

For example, if the brightness of the first area 901 is 100%, the brightness of the second area 902 may be 50%, 60%, 70%, 80%, etc., and the brightness of the third area 903 may be 0%, 10%, 20%, 30%, 40%, etc.

In some embodiments, the first brightness value, the second brightness value, and the third brightness value may be predetermined by the user. In some embodiments, the first brightness value, the second brightness value, and the third brightness value may be different for different application scenario.

In some embodiments, the brightness of the area outside the first area 901 may be controlled based on a relationship of the brightness and a distance between the area and the first area 901. As the distance between the area and the first area 901 increases, the brightness decreases gradually. The gradual decreasing of the brightness may have a parabolic profile, a spherical profile, a Gaussian profile, etc. The relationship of the brightness and the distance between the area and the first area 901 may be a linear relationship, a polynomial relationship, an exponential relationship, a logarithmic relationship, a power relationship, etc. In some embodiments, the relationship of the brightness and the distance between the area and the first area 901 may be predetermined by the user. For example, the relationship of the brightness and the distance between the area and the first area 901 may as follows:

$$\text{Brightness} = A - B * \text{Distance} \qquad (1)$$

where A and B are two constants.

In some embodiments, the brightness of the area of the display of the near eye display system may be controlled to cause a diameter of the pupil of the user to be less than or equal to 4 mm.

In some embodiments, the brightness of the area of the display of the near eye display system may be controlled based on the current size of the pupil of the user, to cause the size of the pupil of the user to be in the predetermined range.

In some embodiments, the predetermined range may be a range of 2 mm to 4 mm.

In some embodiments, a target brightness of the display is determined based on the predetermined range of the size of the pupil of the user, and the brightness of the area of the display that the user is looking at is controlled to be equal to the target brightness.

For example, in a case the user is wearing the near eye display system to read a text displayed on the display 90, a color of a background of the text is white, and a color of the text is black. The original brightness of the display 90 is around 100 NIT. A target brightness of the display is determined based on the predetermined range of the size of the pupil of the user. The target brightness is greater than 100 NIT, which may be 110 NIT, 120 NIT, 190 NIT, etc. Then the brightness of the area of the display where the user is looking at is controlled to increase to be higher than 100 NIT, to cause the size of the pupil of the user to be in the predetermined range. The brightness of the other area of the display 90 may be controlled to decrease to be lower than 100 NIT, such as 50 NIT.

In the method for controlling the near eye display system consistent with the embodiments of the present disclosure, the eye movement of the user wearing the near eye display system is obtained using the eye tracking sensor of the near eye display system. Then the area of the display of the near eye display system is determined based on the eye movement of the user, where the area of the display is an area that the user is looking at. The brightness of the area of the display of the near eye display system is controlled to cause the size of the pupil of the user to be in a predetermined range. Therefore, the pupil size of the user can be maintained in a predetermined range, such as less than or equal to 4 mm, by controlling the brightness of the area of the display that the user is looking at in real time, realizing a comfortable viewing brightness for the eyes of the user, reducing the ghosts and strayed light, reducing the tiredness of the user, and improving the user experience and efficiency.

The sequence numbers of the foregoing embodiments of the present disclosure are merely for description purpose and do not indicate the preference of the embodiments.

When the integrated unit in the foregoing embodiments is implemented in the form of a software functional unit and sold or used as an independent product, the integrated unit may be stored in the foregoing computer-readable storage medium. Based on such an understanding, the technical solution of the present disclosure essentially, or a part contributing to the related art, or all or a part of the technical solution may be implemented in a form of a software product. The computer software product is stored in a storage medium and includes several instructions for instructing one or more computer devices (which may be a personal computer, a server, a network device, or the like) to perform all or some of steps of the methods in the embodiments of the present disclosure.

In the foregoing embodiments of the present disclosure, descriptions of the embodiments have different emphases. As for parts that are not described in detail in one embodiment, reference can be made to the relevant descriptions of the other embodiments.

In the several embodiments provided in the present disclosure, it is to be understood that the disclosed client can be implemented in other manners. The apparatus embodiments described above are merely exemplary. For example, the division of the units is merely the division of logic functions and can use other division manners during actual implementation. For example, a plurality of units or components can be combined, or can be integrated into another system, or some features can be omitted or not performed. In addition, the coupling, or direct coupling, or communication connection between the displayed or discussed components can be the indirect coupling or communication connection through some interfaces, units, or modules, and can be in electrical or other forms.

The units described as separate parts can or cannot be physically separate. Parts displayed as units can or cannot be physical units, and can be located in one position, or can be distributed on a plurality of network units. Some or all of the units can be selected according to actual requirements to achieve the objectives of the solutions in the embodiments.

In addition, functional units in the embodiments of the present disclosure can be integrated into one processing unit, or each of the units can exist alone physically, or two or more units are integrated into one unit. The foregoing integrated unit can be implemented in the form of hardware or can be implemented in the form of a software function unit.

Although the principles and implementations of the present disclosure are described by using specific embodiments in the specification, the foregoing descriptions of the embodiments are only intended to help understand the method and core idea of the method of the present disclosure. Meanwhile, a person of ordinary skill in the art may make modifications to the specific implementations and application range according to the idea of the present disclosure. In conclusion, the content of the specification should not be construed as a limitation to the present disclosure.

What is claimed is:

1. A method for controlling a near eye display system, comprising:
   obtaining an eye movement of a user wearing the near eye display system using an eye tracking sensor of the near eye display system;
   determining a target area of a display of the near eye display system based on the eye movement of the user, the target area of the display being an area that the user is looking at; and
   controlling a brightness of the target area of the display of the near eye display system to cause a size of a pupil of the user to be in a predetermined range, wherein the predetermined range includes a diameter threshold which a diameter of the pupil of the user is less than or equal to.

2. The method of claim 1, wherein obtaining the eye movement of the user wearing the near eye display system using the eye tracking sensor of the near eye display system includes:
   obtaining a gaze direction of an eye of the user using the eye tracking sensor.

3. The method of claim 2, wherein determining the target area of the display of the near eye display system based on the eye movement of the user includes:
   determining the target area of the display of the near eye display system based on the gaze direction of the eye of the user and a distance between the eye of the user and the display of the near eye display system.

4. The method of claim 3, further comprising:
   obtaining the distance between the eye of the user and the display of the near eye display system.

5. The method of claim 1, further comprising:
   updating the target area of the display of the near eye display system based on the eye movement of the user in real time.

6. The method of claim 1, wherein controlling the brightness of the target area of the display of the near eye display system to cause the size of the pupil of the user to be in the predetermined range includes:
   controlling the brightness of the target area of the display of the near eye display system to be different from a brightness of a non-target area of the display of the near eye display system different from the target area of the display.

7. The method of claim 6, wherein controlling the brightness of the target area of the display of the near eye display system to be different from the brightness of the non-target area of the display of the near eye display system different from the target area of the display includes:
   controlling the brightness of the target area of the display of the near eye display system to be higher than the brightness of the non-target area of the display of the near eye display system.

8. The method of claim 1, wherein:
   the target area of the display is a first area;
   controlling the brightness of the target area of the display of the near eye display system to be different from a brightness of non-target area of the display of the near eye display system different from the target area of the display includes:
   determining a second area of the display of the near eye display system, the second area surrounding the first area;
   controlling the brightness of the first area of the display to be a first brightness value;
   controlling a brightness of the second area of the display to be a second brightness value, the second brightness value being lower than the first brightness value; and
   controlling a brightness of a third area of the display of the near eye display system to be a third brightness value, the third area being different from the first area and the second area, and the third brightness value being lower than the second brightness value.

9. The method of claim 1, wherein the diameter threshold is 4 mm.

10. The method of claim 1, wherein controlling the brightness of the target area of the display of the near eye display system to cause the size of the pupil of the user to be in the predetermined range includes:
obtaining a current size of the pupil of the user using the eye tracking sensor; and
controlling the brightness of the target area of the display of the near eye display system based on the current size of the pupil of the user, to cause the size of the pupil of the user to be in the predetermined range.

11. The method of claim 1, controlling the brightness of the target area of the display of the near eye display system to cause the size of the pupil of the user to be in the predetermined range includes:
determining a target brightness of the display based on the predetermined range of the size of the pupil of the user; and
controlling the brightness of the target area of the display of the near eye display system to be equal to the target brightness.

12. A device for controlling a near eye display system, the near eye display system including a display and an eye tracking sensor configured to track an eye movement of a user, the device comprising:
a memory storing a computer program; and
a processor configure to execute the computer program to:
obtain the eye movement of the user using the eye tracking sensor of the near eye display system;
determine a target area of the display of the near eye display system based on the eye movement of the user, the target area of the display being an area that the user is looking at; and
control a brightness of the target area of the display of the near eye display system to cause a size of a pupil of the user to be in a predetermined range, wherein the predetermined range includes a diameter threshold which a diameter of the pupil of the user is less than or equal to.

13. The device of claim 12, wherein the processor is further configured to:
obtain a gaze direction of an eye of the user using the eye tracking sensor.

14. The device of claim 13, wherein the processor is further configured to:
determine the target area of the display of the near eye display system based on the gaze direction of the eye of the user and a distance between the eye of the user and the display of the near eye display system.

15. The device of claim 12, wherein the processor is further configured to:
control the brightness of the target area of the display of the near eye display system to be different from a brightness of a non-target area of the display of the near eye display system different from the target area of the display.

16. The device of claim 15, wherein the processor is further configured to:
control the brightness of the target area of the display of the near eye display system to be higher than the brightness of the non-target area of the display of the near eye display system.

17. The device of claim 12, wherein:
the target area of the display is a first area; and
the processor is further configured to:
determine a second area of the display of the near eye display system, the second area surrounding the first area;
control the brightness of the first area of the display to be a first brightness value;
control a brightness of the second area of the display to be a second brightness value, the second brightness value being lower than the first brightness value; and
control a brightness of a third area of the display of the near eye display system to be a third brightness value, the third area being different from the first area and the second area, and the third brightness value being lower than the second brightness value.

18. The device of claim 12, wherein the processor is further configured to:
obtain a current size of the pupil of the user using the eye tracking sensor; and
control the brightness of the target area of the display of the near eye display system based on the current size of the pupil of the user, to cause the size of the pupil of the user to be in the predetermined range.

19. The device of claim 12, the processor is further configured to:
determine a target brightness of the display based on the predetermined range of the size of the pupil of the user; and
control the brightness of the target area of the display of the near eye display system to be equal to the target brightness.

20. A non-transitory computer-readable storage medium storing computer instructions that, when executed by a processor, causing the processor to perform:
obtaining an eye movement of a user wearing a near eye display system using an eye tracking sensor of the near eye display system;
determining a target area of a display of the near eye display system based on the eye movement of the user, the target area of the display being an area that the user is looking at; and
controlling a brightness of the target area of the display of the near eye display system to cause a size of a pupil of the user to be in a predetermined range, wherein the predetermined range includes a diameter threshold which a diameter of the pupil of the user is less than or equal to.

* * * * *